United States Patent
Almkvist et al.

(10) Patent No.: US 6,609,365 B2
(45) Date of Patent: Aug. 26, 2003

(54) METHOD OF REDUCTION EMISSIONS IN THE EXHAUST GASES OF AN INTERNAL COMBUSTION ENGINE

(75) Inventors: Göran Almkvist, Grabo (SE); Karin Thorn, Gothenburg (SE)

(73) Assignee: Volvo Car Corporation, Göteborg (SE)

(*) Notice: Subject to any disclaimer, the term of this patent is extended or adjusted under 35 U.S.C. 154(b) by 0 days.

(21) Appl. No.: 09/683,299

(22) Filed: Dec. 11, 2001

(65) Prior Publication Data

US 2002/0189239 A1 Dec. 19, 2002

Related U.S. Application Data

(63) Continuation of application No. PCT/SE00/01192, filed on Jun. 8, 2000.

(30) Foreign Application Priority Data

Jun. 11, 1999 (SE) .............................................. 9902218

(51) Int. Cl.[7] .............................................. F01N 3/00
(52) U.S. Cl. .......................................... 60/285; 60/284
(58) Field of Search .................. 60/284, 285; 123/90.15, 123/90.16, 90.17, 192.1, 339.19, 352

(56) References Cited

U.S. PATENT DOCUMENTS

| | | | | |
|---|---|---|---|---|
| 4,398,514 A | * | 8/1983 | Nakamura .............. | 123/339.12 |
| 4,501,240 A | * | 2/1985 | Aono ..................... | 123/339.12 |
| 4,619,232 A | * | 10/1986 | Morris ................... | 123/339.11 |
| 5,218,945 A | * | 6/1993 | Kapellen et al. ............ | 123/352 |
| 5,517,965 A | * | 5/1996 | Notsu et al. ................ | 123/352 |
| 5,614,809 A | | 3/1997 | Kiuchi et al. | |
| 5,630,394 A | * | 5/1997 | Grizzle et al. ......... | 123/339.23 |
| 5,738,070 A | * | 4/1998 | Donaldson et al. ......... | 123/352 |
| 5,765,372 A | * | 6/1998 | Mitobe et al. ................ | 60/301 |
| 5,848,529 A | * | 12/1998 | Katoh et al. ................... | 60/274 |
| 6,109,237 A | * | 8/2000 | Pels et al. .............. | 123/339.19 |
| 6,367,446 B1 | * | 4/2002 | Kanamaru et al. ..... | 123/339.12 |
| 6,443,126 B1 | * | 9/2002 | Morimoto et al. ..... | 123/339.15 |
| 6,474,291 B2 | * | 11/2002 | Collins et al. ........ | 123/198 DB |

FOREIGN PATENT DOCUMENTS

| | | |
|---|---|---|
| EP | 0727574 A1 | 8/1996 |
| EP | 0874151 A2 | 10/1998 |

* cited by examiner

*Primary Examiner*—Thomas Denion
*Assistant Examiner*—Diem Tran
(74) *Attorney, Agent, or Firm*—Howrey Simon Arnold & White LLP

(57) ABSTRACT

A method of reducing emissions in the exhaust gases of an internal combustion engine that has at least one cylinder to which an air/fuel mixture is supplied when a crankshaft of the internal combustion engine is rotated, at least one intake valve, at least one exhaust valve, and a piston reciprocating between a top dead-center position and a bottom dead-center position in the cylinder. The method comprises the following steps: an air/fuel mixture with a lambda value greater than 1 is supplied to the cylinder, an electric motor/generator connected to the crankshaft maintains an essentially constant predetermined speed of the crankshaft, and the exhaust valve is controlled so that it opens before the piston has passed the bottom dead-center position is disclosed.

15 Claims, 2 Drawing Sheets

METHOD OF REDUCTION EMISSIONS IN THE EXHAUST GASES OF AN INTERNAL COMBUSTION ENGINE

CROSS REFERENCE TO RELATED APPLICATIONS

The present application is a continuation of International Application No. PCT/SE00/01192, filed Jun. 8, 2000, which claims priority to Swedish Application No. 9902218-8, filed Jun. 11, 1999. Both applications are expressly incorporated herein by reference.

BACKGROUND OF INVENTION

1. Technical Field

The present invention relates to a method of reducing emissions in the exhaust gases of an internal combustion engine. More specifically, the invention relates to a method of reducing emissions in an internal combustion engine having at least one cylinder to which an air/fuel mixture is supplied when a crankshaft of the internal combustion engine rotates, at least one intake valve, at least one exhaust valve, and a piston reciprocating between a top dead-center position and a bottom dead-center position in the cylinder.

2. Background Information

In internal combustion engines, it is desirable to reduce substances or emissions present in the exhaust gases of the engine in order to reduce pollution of the surrounding environment as well as satisfy legal requirements for internal combustion engines. Emissions present in the exhaust gases include, inter alia, carbon monoxide ("CO"), hydrocarbon compounds ("HC") and nitrogen oxides ("$NO_x$").

In order to reduce these emissions in the exhaust gases, the internal combustion engine is provided with a catalytic converter that, by means of a chemical reaction, burns these undesirable emissions completely. The chemical reaction in the catalytic converter occurs only when the catalytic converter has reached a predetermined working temperature. This temperature is reached after a predetermined operating time of the internal combustion engine. When the engine is cold-started, there is therefore no reduction of these undesirable emissions in the catalytic converter.

There are known arrangements that heat the catalytic converter when the internal combustion engine is cold-started. This is done in order to rapidly reach a desirable working temperature of the catalytic converter, thereby making it possible to reduce the undesirable emissions in the exhaust gases of the internal combustion engine at an early stage. In one such known arrangement, an electric heating element is arranged in the catalytic converter. However, this arrangement makes the catalytic converter complicated and expensive to produce.

Another problem that arises when internal combustion engines are cold-started is that a comparatively great amount of fuel in relation to the air supplied, or a rich air/fuel mixture, has to be supplied to the internal combustion engine in order to start the internal combustion engine, and in order to have the internal combustion working at an essentially constant speed while running at idle. This rich air/fuel mixture is also supplied so that the engine will be ready to provide increased torque when the accelerator is operated. By supplying this rich air/fuel mixture, the ability of the internal combustion engine to operate is ensured before the internal combustion engine has reached its operating temperature.

Without any emission control in the catalytic converter, the rich air/fuel mixture results in the CO, HC and $NO_x$ content emitted from the internal combustion engine being high when the internal combustion engine is cold-started.

Attempts have previously been made to reduce the quantity of fuel in relation to the air supplied, i.e., run the internal combustion engine with a leaner air/fuel mixture when the internal combustion engine is cold-started. However, this has resulted in the internal combustion engine working very unevenly when idling, and also poor operation of the internal combustion engine.

The reason why the speed varies while idling is that the torque generated by the internal combustion engine is very sensitive to variations in the lambda value of the air/fuel mixture supplied to the cylinder space of the internal combustion engine when the air/fuel mixture is lean. The lambda value, or excess air factor as it is also known, is the actual air quantity supplied divided by the air quantity theoretically necessary for complete combustion. If the lambda value is greater than 1, the air/fuel mixture is lean. If the lambda value is less than one, the air/fuel mixture is rich.

The fuel supplied by a fuel injection valve can be controlled accurately by means of the internal combustion engine fuel injection system in order to obtain a substantially constant lambda value for the air/fuel mixture supplied. However, when the internal combustion engine is cold, fuel condenses on the comparatively cold walls of the intake duct and the cylinder. The fuel condensed on the walls vaporizes during idling and accompanies the air/fuel mixture flowing in the intake duct and being supplied to the cylinder space. If vaporization of the fuel condensed on the walls is uneven, e.g., on account of pressure variations, temperature gradients, or the flow rate of the air/fuel mixture in the intake duct, a variation in the lambda value of the air/fuel mixture supplied to the cylinder space occurs.

Since torque generated by the internal combustion engine varies during idling when cold-started, the internal combustion engine speed varies. In this regard, the internal combustion engine speed refers to the speed of rotation of the internal combustion engine crankshaft. When the speed varies, the pressure in the intake duct will also vary. This, in turn, leads to vaporization of the condensed fuel varying so that a variation of the lambda value of the air/fuel mixture supplied to the cylinder space occurs. In doing so, the uneven speed of the internal combustion engine is intensified.

Accordingly, there is a need for reducing emissions in the exhaust gases of an internal combustion engine during cold-starting of the engine. Further, there is a need for enabling an internal combustion engine to work with a lean air/fuel mixture.

SUMMARY OF INVENTION

The present invention provides a method of reducing carbon monoxide, hydrocarbon compounds and nitrogen oxides in exhaust gases from an internal combustion engine when cold-started. The invention also makes it possible for an internal combustion engine to work with a lean air/fuel mixture. Further, the invention provides a method for reaching the working temperature of the catalytic converter as rapidly as possible.

This is achieved by a method that includes the steps of supplying an air/fuel mixture with a lambda value greater than 1 to the cylinder, maintaining a substantially constant predetermined speed of the crankshaft by means of an electric motor/generator connected to the crankshaft, and controlling the exhaust valve so that it opens before the piston has passed the bottom dead-center position.

By supplying an air/fuel mixture greater than 1 to the cylinder, undesirable emissions in the exhaust gases emitted from the internal combustion engine are reduced. With the combined electric motor/generator, the internal combustion engine works at a substantially constant speed during idling. By controlling the exhaust valve so that it opens before the piston has passed the bottom dead-center position, the expansion stroke of the piston in the cylinder is interrupted, allowing very hot gases to flow out through the exhaust duct and on to the catalytic converter, thereby rapidly heating the converter.

BRIEF DESCRIPTION OF DRAWINGS

The invention is described in greater detail below by means of an exemplary embodiment shown in the appended drawings, in which.

DETAILED DESCRIPTION

Figure 1:
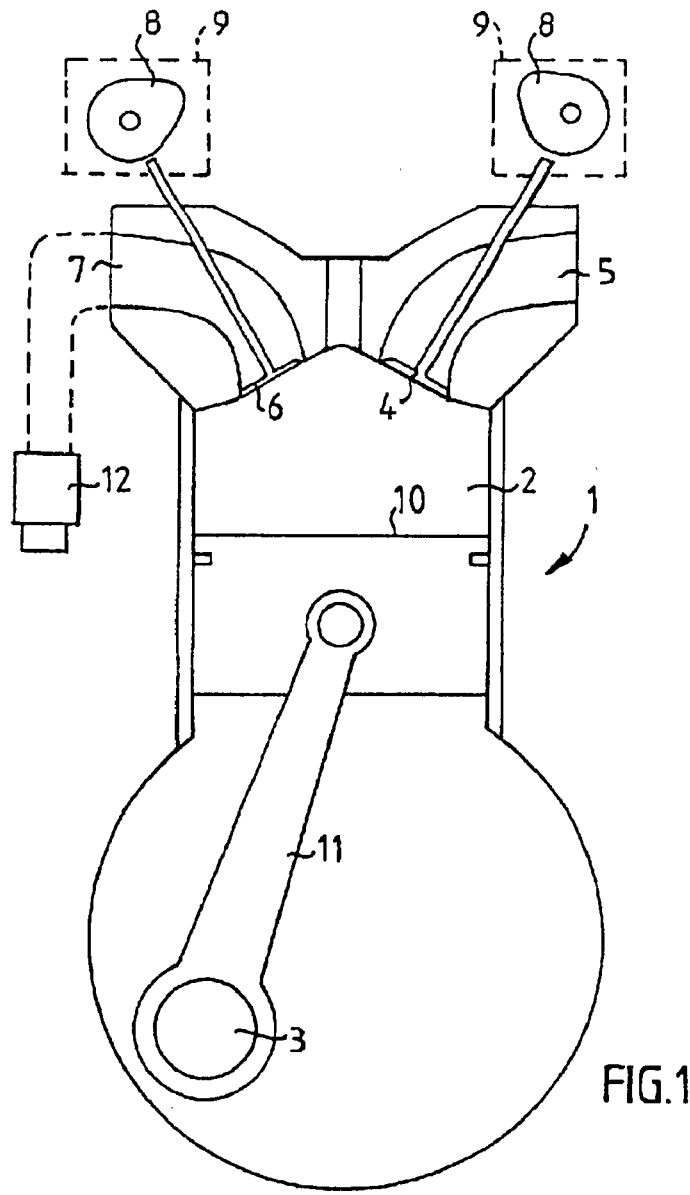
FIG. 1 illustrates a cross section of an internal combustion engine.

FIG. 1 shows an internal combustion engine 1 that has at least one cylinder 2 supplied with an air/fuel mixture when a crankshaft 3 of the internal combustion engine 1 rotates. At least one intake duct 4 opens and closes intake ducts 5 connected to the cylinder 2 and through which an air/fuel mixture is supplied when the engine 1 is working. At least one exhaust valve 6 opens and closes exhaust ducts 7 connected to the cylinder 2 and through which burnt fuel in the form of exhaust gases is removed when the engine 1 is working. The internal combustion engine 1 also includes control members 8 that control the opening and closing of the intake and exhaust valves 4, 6.

In the embodiment illustrated, the control members 8 consist of camshafts that can be adjusted so that the opening and closing time of the intake and exhaust valves 4, 6 can be varied. This is brought about by, for example, a regulating arrangement 9, shown diagrammatically in FIG. 1, that in a known manner rotates the camshafts hydraulically. Other control members 8 are also possible, such as electromagnetically controlled valves. A piston 10, which reciprocates between a top and a bottom dead-center position in the cylinder 2, is mounted on the crankshaft 3 by means of a connecting rod 11. During operation of the internal combustion engine 1, exhaust gases flow from the cylinder 2 through the exhaust ducts 7 and on through a catalytic converter 12. The internal combustion engine 1 is preferably a multi-cylinder four-stroke type.

Figure 2:
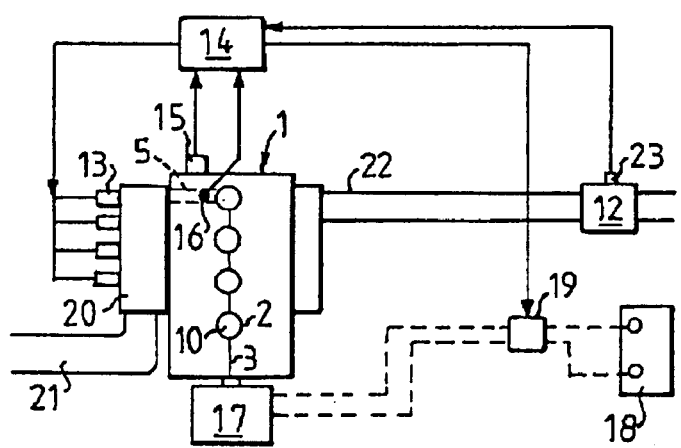
FIG. 2 provides a diagrammatic illustration of an internal combustion engine and an electric motor/generator for implementing the method according to one embodiment of the present invention.

FIG. 2 shows the internal combustion engine 1 diagrammatically. Fuel injection nozzles 13 controlled by a control unit 14 are provided for the intake ducts 5. The control unit 14 is also connected to one or more sensors 15 in the internal combustion engine 1 that sense aspects such as the speed, temperature and other elements of the internal combustion engine 1. Pressure sensors 16 can also be arranged in the intake ducts 5 for sensing the pressure in the intake ducts 5. These pressure sensors 16 are likewise connected to the control unit 14.

An electric motor/generator 17 that functions as an integrated starter motor and generator (ISG) is connected to the crankshaft 3 of the internal combustion engine. Instead of connecting the electric motor/generator 17 directly to the crankshaft 3, a belt, chain or gear transmission, for example, can be used to connect the electric motor/generator 17 to the crankshaft 3. The electric motor/generator 17 is connected to a battery 18 via a control device 19. The control device 19 is connected to the control unit 14 and obtains information from the control unit 14 regarding how the electric motor/generator 17 is to be operated.

When the internal combustion engine 1 is operating, air enters an intake branch pipe 20 via an air intake pipe 21. From the intake branch pipe 20, the air flows on to the intake ducts 5 where it is mixed with fuel that is injected into the intake ducts 5 by means of the fuel injection nozzles 13. The air/fuel mixture then flows into the cylinders 2 and is ignited by at least one spark plug (not shown) arranged in each cylinder 2. The burnt air/fuel mixture then exits in the form of exhaust gases into the atmosphere through an exhaust system 22 connected to the internal combustion engine 1.

As indicated above, the burnt air/fuel mixture contains undesirable emissions. These emissions include carbon monoxide ("CO"), hydrocarbon compounds ("HC") and nitrogen oxides ("$NO_x$"). The exhaust gases are treated in a catalytic converter 12 in the exhaust system 22 that burns these emissions. However, the catalytic converter 12 functions only when it has reached a given working temperature, which takes place after a given heating time after the internal combustion engine 1 has been started. During cold-starting of the internal combustion engine 1, there is therefore no conversion of the above mentioned emissions in the catalytic converter 12.

The content of CO, HC and $NO_x$ in the exhaust gases depends on, inter alia, the mixing ratio of the air/fuel mixture supplied to the cylinders 2. This mixing ratio is usually indicated by a lambda value. The definition of the lambda value, or excess air factor as it is also known, is the actual air quantity supplied divided by the air quantity theoretically necessary. If the lambda value is greater than 1, the air/fuel mixture is lean. If the lambda value is less than one, the air/fuel mixture is rich.

By supplying an air/fuel mixture with a lambda value greater than 1, or a lean air/fuel mixture, to the cylinders when the internal combustion engine is cold-started, the content of hydrocarbon compounds HC in the exhaust gases can be considerably reduced. If a lean air/fuel mixture is supplied to the internal combustion engine 1 when it is cold, i.e., prior to the internal combustion engine 1 reaching its working temperature, uneven idling speed occurs as explained above.

The electric motor/generator 17 connected to the crankshaft 3 maintains a substantially constant predetermined speed of the crankshaft 3. This is accomplished by controlling the speed of the internal combustion engine 1 so that when the speed of the internal combustion engine 1 exceeds a predetermined speed, the electric motor/generator 17 is controlled so that the speed of the internal combustion engine 1 decreases. The electric motor/generator 17 then works as a generator, reducing the speed of the internal combustion engine 1. When the speed of the internal combustion engine 1 falls below a predetermined speed, the electric motor/generator 17 is controlled so as to increase the speed of the internal combustion engine 1. In this manner, the electric motor/generator 17 works as an electric motor, increasing the speed of the internal combustion engine 1. The sensor 15 senses the speed of the internal combustion engine 1 by, for example, sensing the speed of the crankshaft 3. The sensor 15 sends signals to the control unit 14, which processes these signals and then instructs the control device 19 which, in turn, defines how the electric motor/generator 17 is to work.

It is also possible to control the electric motor/generator 17 so that pressure in the intake ducts 5 is kept substantially constant. A pressure sensor 16 can be arranged in at least one of the intake ducts 5 in order to measure the pressure in those ducts 5. The pressure sensor 16 is connected to the control unit 14 of the internal combustion engine 1. The control unit 14 sends signals to a control device 19 intended for the electric motor/generator 17. By maintaining a substantially constant pressure in the intake ducts 5 through use of the electric motor/generator 17, a substantially constant speed of the internal combustion engine 1 can be obtained when the internal combustion engine 1 is cold and run with a lean air/fuel mixture. The electric motor/generator 17 is connected to the crankshaft 3 so that when the pressure in the intake ducts exceeds a predetermined pressure, the electric motor/generator 17 drives the crankshaft 3 in order to reduce the pressure in the intake ducts 5. When the pressure in the intake ducts 5 falls below a predetermined pressure, the crankshaft 3 drives the electric motor/generator 17 in order to increase the pressure in the intake ducts 5.

When a cold internal combustion engine 1 is started, the catalytic converter 12 is also cold as mentioned above. In order for the catalytic converter 12 to be capable of effectively reducing undesirable emissions in the exhaust gases of the engine 1, the catalytic converter 12 must reach a given working temperature. Ignition of the air/fuel mixture supplied to the cylinder 2 is carried out at a crankshaft angle of about 10° before to about 20° after the top dead-center position. Preferably, ignition is carried out at a crankshaft angle of about 0° to about 10° after the top dead-center position. By controlling the exhaust valve 6 so that it opens before the piston 10 has passed the bottom dead-center position during the expansion stroke, expansion is interrupted, allowing very hot exhaust gases to flow through the exhaust duct 7 and on to the catalytic converter 12. In doing so, the catalytic converter 12 is heated very rapidly by the hot exhaust gases to its desired working temperature. It has been found that if the exhaust valve 6 is controlled so that it opens at a crankshaft angle of about 90° to about 130° after the top dead-center position, preferably at a crankshaft angle of about 100° after the top dead-center position, the working temperature of the catalytic converter 12 is reached very rapidly. A temperature sensor 23 can be arranged so as to sense the temperature of the catalytic converter 12 and send information about the temperature of the catalytic converter 12 to the control unit 4.

Figure 3:
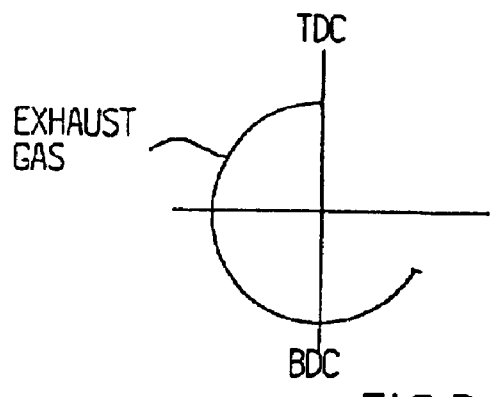
FIG. 3 is a graph of the opening and closing times of exhaust valves.

FIG. 3 shows a diagram of the opening and closing times of the exhaust valves. The opening time of the exhaust valve 6 is relatively long. In this regard, the crankshaft angle means the angle through which the crankshaft 3 has rotated since the piston 10 was located in the top dead-center position. When the piston 10 is located in the top dead-center position, the crankshaft angle is approximately zero.

The electric motor/generator 17 can be controlled so that it increases the speed of the internal combustion engine 1 beyond that speed produce by the internal combustion engine 1. This means that the electric motor/generator 17 drives the internal combustion engine 1. Energy is supplied to the internal combustion engine 1, resulting in the heat flow to the catalytic converter 12 increasing so that the catalytic converter 12 is heated more rapidly.

Figure 4:
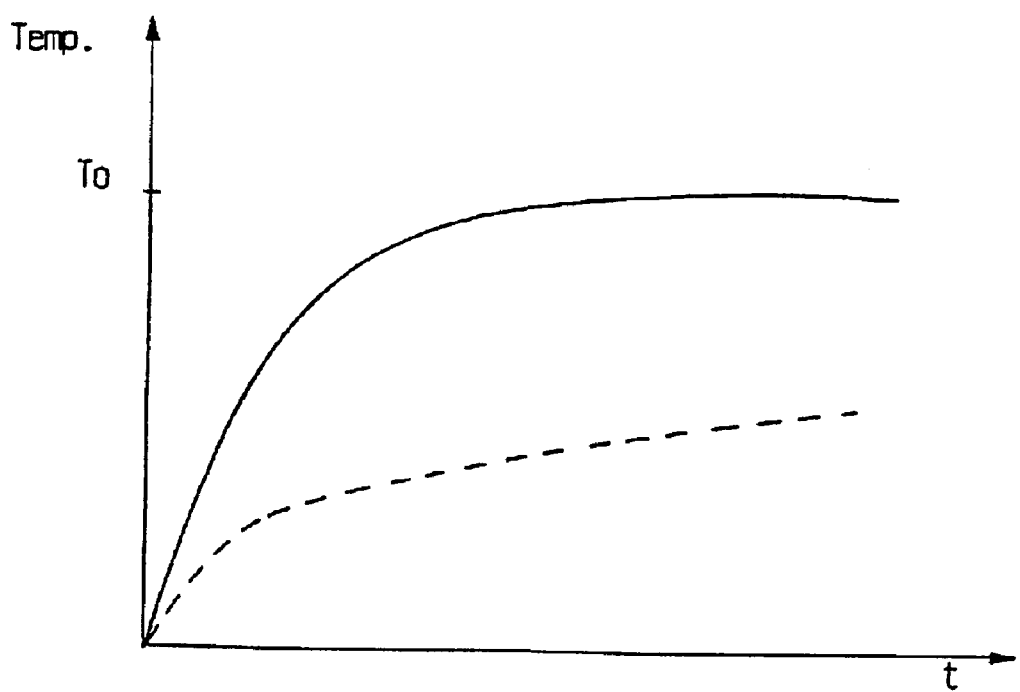
FIG. 4 is a graph of the heating time of the catalytic converter for a conventionally controlled internal combustion engine and an internal combustion engine controlled according to the method according to the present invention.

FIG. 4 shows a diagram of the heating time of the catalytic converter 12 for a conventionally controlled internal combustion engine, indicated by the broken line, and an internal combustion engine 1 controlled according to the method of the present invention, indicated by the solid curve. As can be seen from FIG. 4, the catalytic converter 12 of the internal combustion engine controlled according to the method of the present invention will reach the working temperature more rapidly than the catalytic converter of the engine controlled conventionally.

The internal combustion engine 1 can be supercharged by means of an exhaust turbo or a mechanical compressor (not shown). In a supercharged internal combustion engine 1, energy is supplied from the compressor or the turbo, so that the combustion temperature after expansion in the cylinder increases further. This allows the catalytic converter to be heated more rapidly.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method of reducing emissions in the exhaust gases of an internal combustion engine having at least one cylinder to which an air/fuel mixture is supplied when an engine crankshaft rotates, at least one intake valve, at least one exhaust valve, and a piston reciprocating between a top dead-center position and a bottom dead-center position in the cylinder, the method comprising the steps of:

supplying an air/fuel mixture with a lambda value greater than 1 to the cylinder, maintaining an essentially constant predetermined speed of the crankshaft by use of an electric motor/generator connected to the crankshaft, and controlling the exhaust valve so that it opens before the piston has passed the bottom dead-center position.

2. The method according to claim 1, wherein the exhaust valve is controlled so that it opens at a crankshaft angle of about 90° to about 130° after the top dead-center position.

3. The method according to claim 2, wherein the exhaust valve is controlled so that it opens at a crankshaft angle of about 100° after the top dead-center position.

4. The method according to claim 1, wherein the electric motor/generator connected to the crankshaft is controlled so that, when the speed of the internal combustion engine exceeds a predetermined speed, the electric motor/generator works as a generator reducing the speed of the internal combustion engine.

5. The method according to claim 1, wherein the electric motor/generator connected to the crankshaft is controlled so that, when the speed of the internal combustion engine falls below a predetermined speed, the electric motor/generator works as an electric motor increasing the speed of the internal combustion engine.

6. The method according to claim 1, further comprising the step of controlling the electric motor/generator so that the electric motor/generator drives the internal combustion engine at a speed which is greater than the speed which the internal combustion engine itself produces, resulting in the heat flow to a catalytic converter arranged in the internal combustion engine increasing.

7. The method according to claim 1, further comprising the step of controlling the electric motor/generator connected to the crankshaft so that when pressure in at least one intake duct connected to the cylinder exceeds a predetermined pressure, the electric motor/generator drives the crankshaft.

8. The method according to claim 1, further comprising the step of controlling the electric motor/generator connected to the crankshaft so that when the pressure in the intake duct falls below a predetermined pressure, the crankshaft drives the electric motor/generator.

9. The method according to claim 1, further comprising the step of controlling the exhaust valve so that the exhaust valve closes when the piston is located at the top dead-center.

10. The method according to claim 1, further comprising the step of carrying out ignition of the air/fuel mixture supplied to the cylinder at a crankshaft angle of about 10° before to about 30° after the top dead-center position.

11. The method according to claim 1, further comprising the step of carrying out ignition of the air/fuel mixture supplied to the cylinder at a crankshaft angle of about 0° to about 10° after the top dead-center position.

12. The method according to claim 1, wherein the lambda value of the air/fuel mixture supplied to the cylinder lies substantially from about 1.1 to about 1.4.

13. The method according to claim 12, wherein lambda value of the air/fuel mixture supplied to the cylinder lies substantially from about 1.1 to about 1.2.

14. The method according to claim 1, wherein the method is used substantially when cold-starting the internal combustion engine.

15. The method according to claim 1, further comprising the step of arranging adjustable control members in the internal combustion engine in order to control the opening and closing of the intake and exhaust valves whereby the time of opening and closing of the intake and exhaust valves can be varied.

* * * * *

UNITED STATES PATENT AND TRADEMARK OFFICE
CERTIFICATE OF CORRECTION

PATENT NO. : 6,609,365 B2
DATED : August 26, 2003
INVENTOR(S) : Goran Almkvist and Karin Thorn It is certified that error appears in the above-identified patent and that said Letters Patent is hereby corrected as shown below:

<u>Title page,</u>
Item [54], please correct the Title as follows:
-- METHOD OF REDUCING EMISSIONS IN THE EXHAUST GASES OF AN INTERNAL COMBUSTION ENGINE --

Signed and Sealed this

Fourth Day of November, 2003

JAMES E. ROGAN
*Director of the United States Patent and Trademark Office*